United States Patent
Poslinski et al.

(10) Patent No.: US 6,782,056 B1
(45) Date of Patent: Aug. 24, 2004

(54) DSS PACKET REORDERING FUNCTION

(75) Inventors: Thomas Poslinski, San Diego, CA (US); Kim A. Ryal, San Diego, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 650 days.

(21) Appl. No.: 09/630,576

(22) Filed: Aug. 3, 2000

Related U.S. Application Data

(60) Provisional application No. 60/146,979, filed on Aug. 3, 1999.

(51) Int. Cl.$^7$ ............................... H04L 7/04
(52) U.S. Cl. ................... 375/262; 375/130
(58) Field of Search ................ 375/130, 262; 370/394; 709/246; 714/819, 755

(56) References Cited

U.S. PATENT DOCUMENTS

| | | | | |
|---|---|---|---|---|
| 5,173,897 A | * | 12/1992 | Schrodi et al. | 370/394 |
| 5,339,311 A | * | 8/1994 | Turner | 370/394 |
| 5,383,182 A | * | 1/1995 | Therasse et al. | 370/394 |
| 5,566,183 A | * | 10/1996 | Partyka | 714/701 |
| 5,572,532 A | * | 11/1996 | Fimoff et al. | 714/702 |
| 5,590,122 A | * | 12/1996 | Sandorfi et al. | 370/394 |
| 5,917,835 A | * | 6/1999 | Barrett et al. | 714/755 |
| 6,226,687 B1 | * | 5/2001 | Harriman et al. | 709/246 |
| 6,421,796 B1 | * | 7/2002 | Gatherer | 714/702 |
| 6,434,148 B1 | * | 8/2002 | Park | 370/394 |
| 6,529,558 B1 | * | 3/2003 | Fimoff et al. | 375/262 |

* cited by examiner

*Primary Examiner*—Stephen Chin
*Assistant Examiner*—Lawarence Williams
(74) *Attorney, Agent, or Firm*—Mayer Fortkort & Williams, PC; Karin L. Williams, Esq.

(57) ABSTRACT

A method and system for reordering a plurality of DSS data packets stored in a memory is provided that utilizes a memory buffer capable of storing at least one DSS data packet. The last data packet (Pn) is located and moved to the memory buffer. The data packet (Px) that should be located at the location of the last packet (Pn) is moved to fill the space vacated. If the last data packet should be located at the location of Px, then the last but one (Pn−1) packet is located and moved to the memory buffer. The packet (Px') that should be located at the location of Pn−1 is then moved to the location of Pn−1. The process is repeated until all the data packets are reordered.

8 Claims, 6 Drawing Sheets

DSS PACKET REORDERING FUNCTION

CROSS REFERENCE TO RELATED APPLICATIONS

This application claims the benefit of priority under 35 U.S.C. § 119(e) of U.S. Provisional Application No. 60/146,979 filed on Aug. 3, 1999, the entirety of which is incorporated herein by reference.

In accordance with 37 CFR § 1.121(b)(1)(iii), Attachment A contains marked up versions of the replacement paragraph illustrating the newly introduced changes in the specification.

COPYRIGHT NOTICE

Appendix "A" of the disclosure of this patent application contains material, which is subject to copyright protection. The copyright owner has no objection to the facsimile reproduction of the patent document or the patent disclosure, as it appears in the Patent and Trademark Office patent file or records, but otherwise reserves all copyrights whatsoever.

FIELD OF THE INVENTION

The present invention involves a data packet reordering system, and in particular a system for reordering digital spread spectrum (DSS) data packets using a reduced memory buffer.

BACKGROUND OF THE INVENTION

In Direct-TV data protocol, program guides are sent as a collection of data packets. FIG. 1A shows a DSS transmitter 101 that transmits DSS data packets that are received by a DSS receiver 102 and routed to a SDRAM 103. The packets are stored in a random order.

FIG. 1B shows a typical SDRAM 103 with data packets (P0–P8) 105 stored at different locations 104, illustrated as L0–L8. FIG. 1B shows a first set of data packets 106 (packets P0–P4) stored at memory locations L4 to L8 respectively and a second set of data packets (P5–P8) 107 stored at memory locations L0 to L3 respectively.

However for efficient processing, the packets should be stored in the order illustrated in FIG. 1C, i.e. packet P0 should be stored in location L0, P1 in location L1 and so forth.

Currently a second memory buffer is used to reorder the data packets as they are received. FIG. 1D shows a second memory buffer 111 used for reordering data packets. When the first set 106 is received, in step S101, packets P0–P4 are moved to memory buffer 111. In step S102, data packets in second set 107 (P5–P8) are moved to the desired locations, L5–L8, as shown in FIG. 1C. Finally, in step S103, data packets in set 106 are moved to locations L0–L4. Currently, the reordering system is expensive and hence increases the overall system cost.

Therefore, what is needed is a system that can efficiently reorder incoming data packets without expensive memory buffer requirements.

SUMMARY

The present invention addresses the foregoing by providing a method and system for reordering digital spread spectrum (DSS) data packets. The process locates the location (Ln) of a last data packet (Pn), and moves Pn to a memory buffer that can at least store a DSS data packet. Thereafter, the process locates a data packet (Px) stored at location Lx, wherein Px should be located at Ln. The process also determines if packet Pn should be located at location Lx, instead of Px. If Pn should not be located at Lx, the process moves Px to Ln.

If Pn should be located at Lx, the process locates the second last packet's (Pn-1) location (Ln-1), and moves Pn-1 to the memory buffer. Thereafter, the process locates a packet (Px') at location Lx', that should be located at Ln-1; and also determines if Pn-1 should be located at Lx'. The process then moves Px' to Ln-1 if Pn-1 should not be located at location Lx'. The process is repeated until all the data packets have been reordered.

By virtue of the foregoing aspects of the present invention, a memory buffer that is smaller than conventional systems is required to reorder numerous data packets. Hence memory cost is reduced and that reduces the overall cost of the system. Furthermore, the present process is more efficient than the conventional prior art systems because data packets are only moved once, unlike conventional systems where data packets are moved more than once.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The use of similar reference numerals in different figures indicates similar or identical items.

DETAILED DESCRIPTION OF THE PREFERRED EMBODIMENTS

Figure 2:
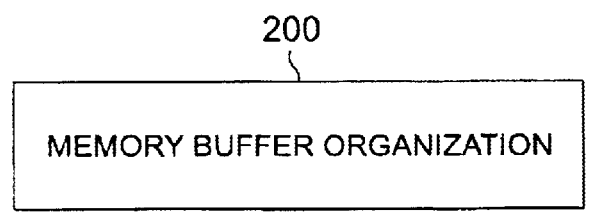
FIG. 2 is a block diagram of a memory buffer, according to one aspect of the present invention.

FIG. 2 shows a memory buffer 200 that is capable of storing data packets.

Figure 1A:
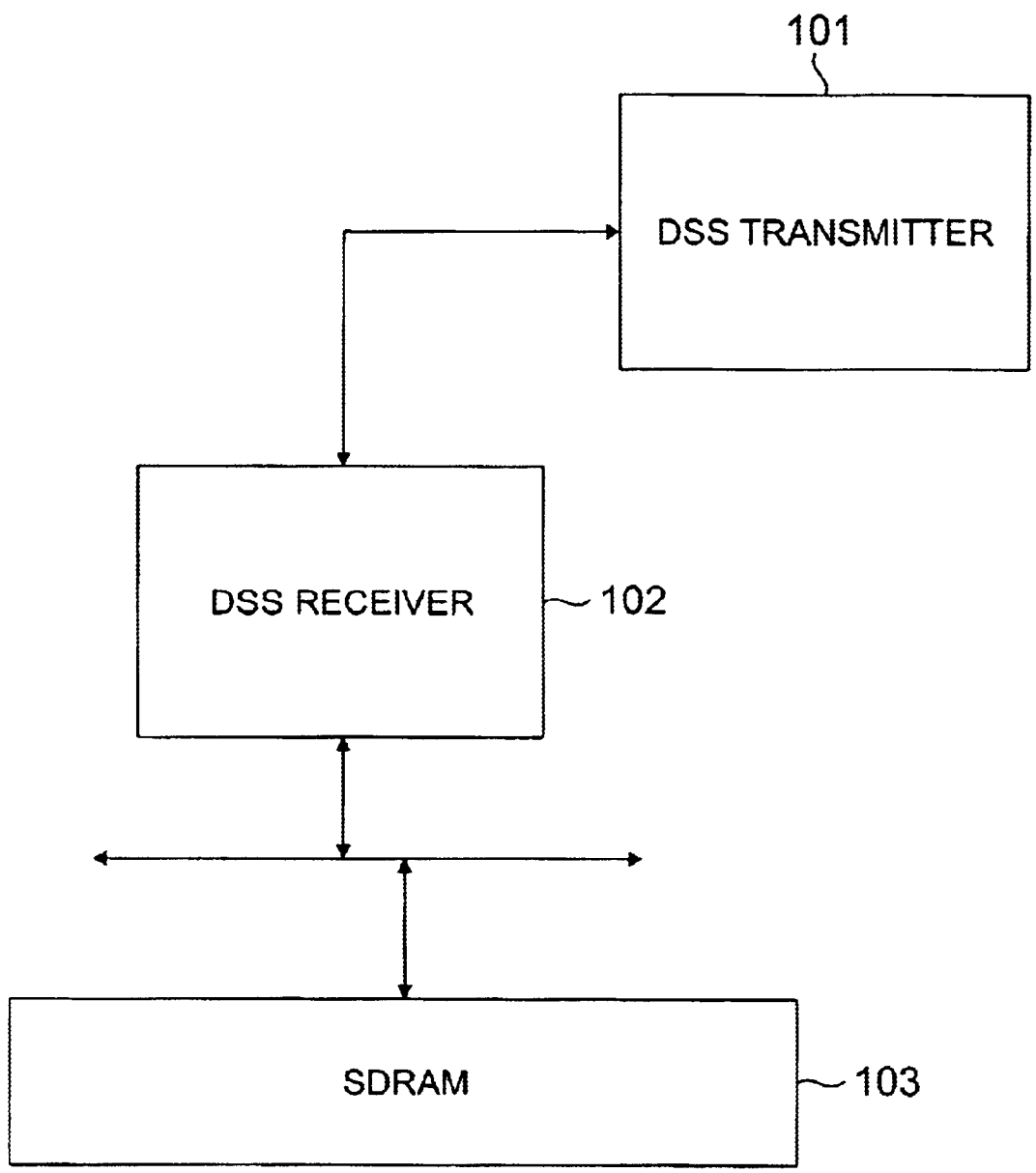
FIG. 1A is a block diagram showing data packet movement from a DSS transmitter to a SDRAM.
Figure 1B:
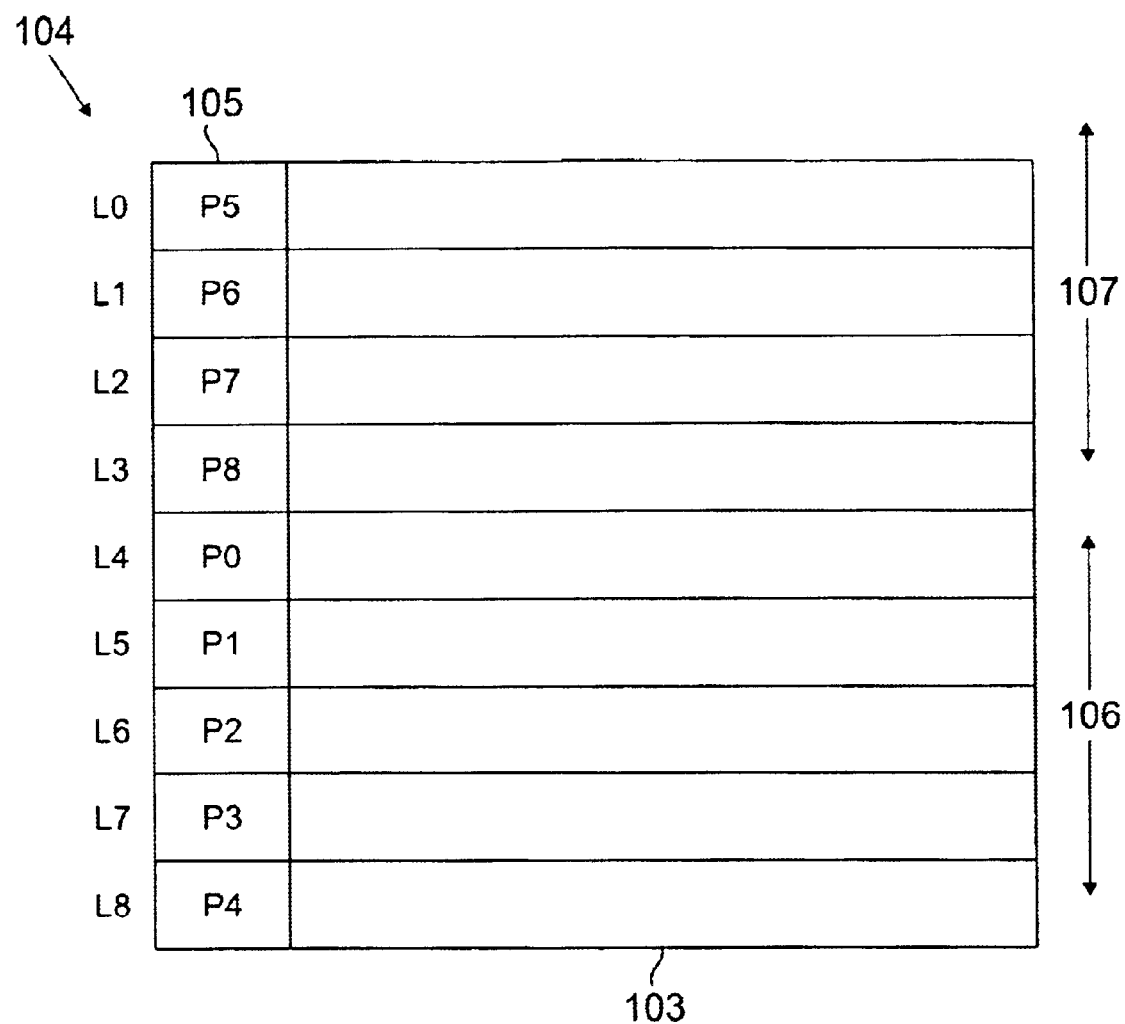
FIG. 1B is a block diagram of the SDRAM showing data packets storage locations.
Figure 1C:
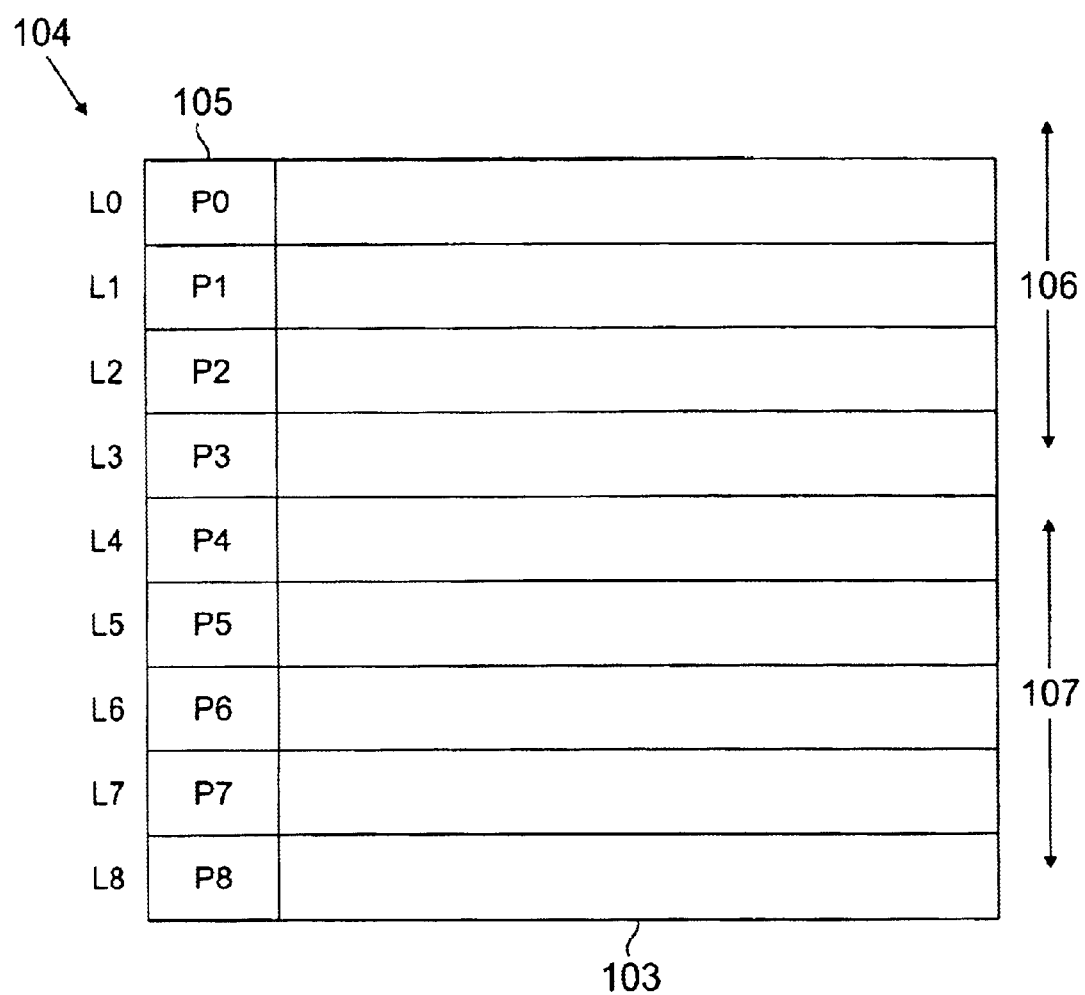
FIG. 1C is a block diagram of desirable data packet storage locations.
Figure 1D:
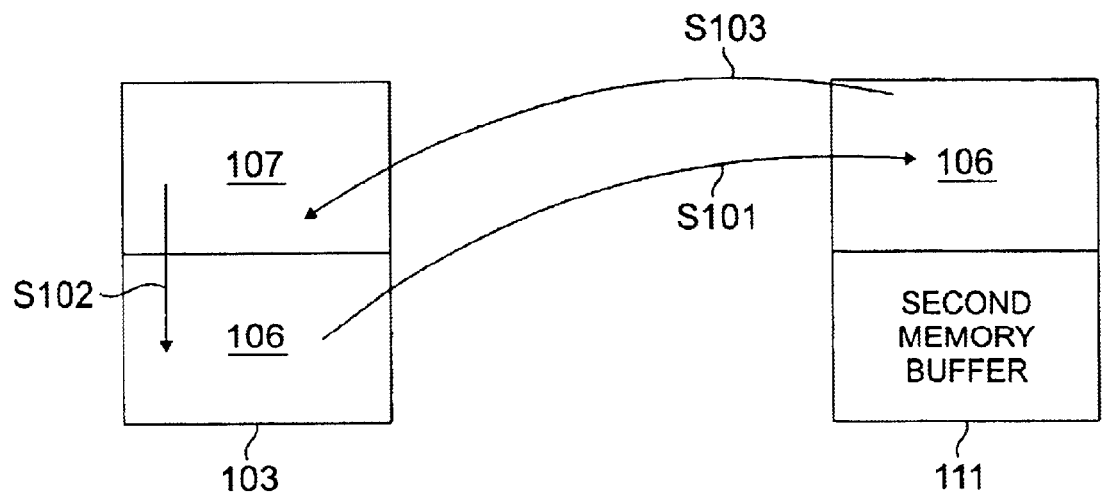
FIG. 1D is a basic flow chart showing the prior art process steps employed to reorder data packets according to conventional systems.
Figure 3:
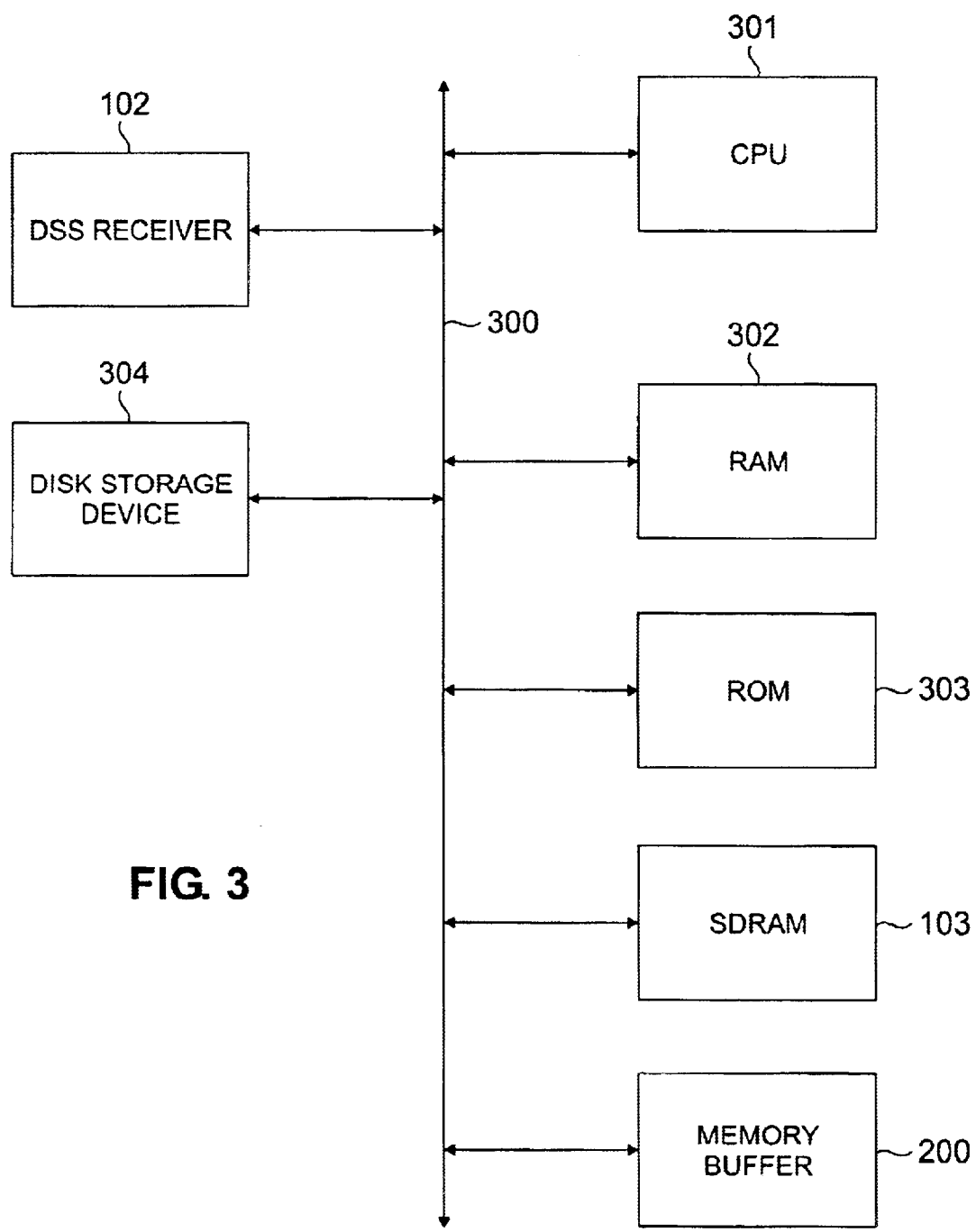
FIG. 3 is a block diagram of the system architecture to implement process steps according to another aspect of the present invention.

FIG. 3 shows a block diagram of the architecture, according to one aspect of the present invention to implement process steps to reorder DSS data packets which are received out of order, for example as illustrated in FIG. 1B, to a desired location, as illustrated in FIG. 1C. It is noteworthy, that the desired locations in FIG. 1C are merely to illustrate one aspect of the present invention and are not meant to limit the invention.

The system illustrated in the FIG. 3 block diagram can be used for a personal computer or a set top box architecture. FIG. 3 shows a CPU 301 for executing computer-executable (or microprocessor executable) process steps and interfaces with computer bus 300. Also shown in FIG. 3 is a rotating disk storage device 304 for storing data. It is noteworthy that the present invention is not limited to using a rotating disk or any specific storage device.

Disk storage device 304 stores operating system program files, computer executable process steps according to one aspect of the present invention and application program files etc. Some of these files are stored on disk 304 using an installation program. For example, CPU 301 executes computer-executable process steps of an installation program so that CPU 301 can properly execute the program.

A random access main memory ("RAM") 302 also interfaces to computer bus 300 to provide CPU 301 with access to memory storage. When executing stored computer-executable process steps from disk 304, CPU 301 stores those process steps in RAM 302 and executes the stored process steps out of RAM 302.

Read only memory ("ROM") 303 is provided to store invariant instruction sequences such as start-up instruction sequences or basic Input/output operating system (BIOS) sequences FIG. 3 also shows DSS receiver 102 that receives data packets from DSS transmitter 101 and then stores them in SDRAM 103. Memory buffer 200 is used to reorder data packets received in SDRAM 103, as described below. Typically, memory buffer 200 is capable of storing at least one data packet.

Figure 4:
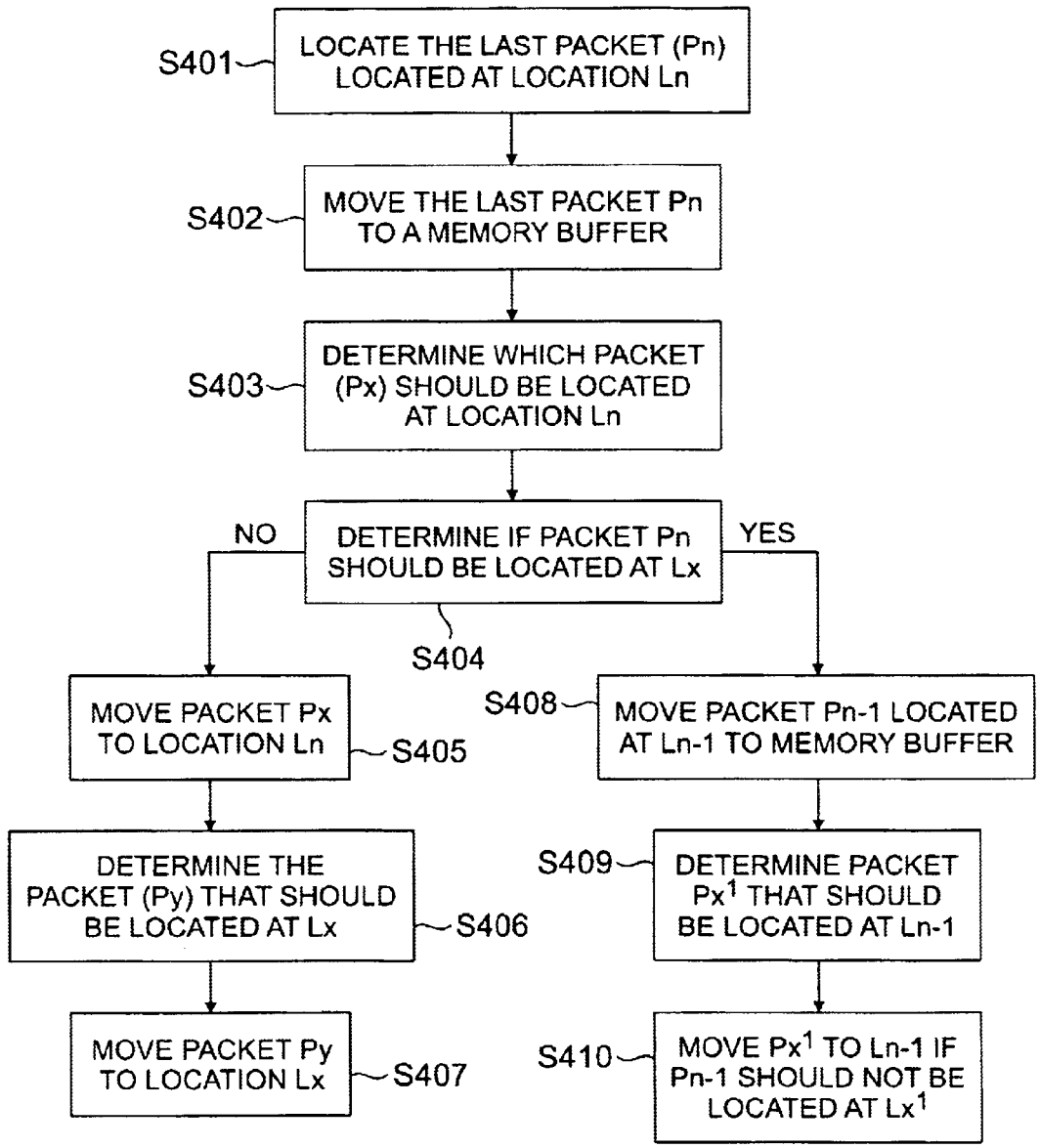
FIG. 4 is a basic flow chart showing process steps according to yet another aspect of the present invention.

FIG. 4 is a flow diagram of computer executable process steps to implement one aspect of the present invention. Generally, the FIG. 4 process steps illustrate a methodology for reordering data packets, such that only a small memory buffer, e.g., memory buffer 200 that can store at least one DSS data packet, is utilized. Data packets are arranged according to a desired data packet location scheme, e.g., as shown in FIG. 1C.

More specifically, in step S401, locate the location (Ln) of the last packet (Pn) in SDRAM 103. For illustration purposes only, location of the last packet (P8) is shown as L3 in FIG. 1B.

In step S402, move the last packet (P8, FIG. 1B) to memory buffer 200 that can store at least one data packet.

In step S403, determine the packet (Px) that should be stored at Ln. As illustrated in FIG. 1C, location L3 should have packet P3. Hence Px in this example is data packet P3.

In step S404, determine if Pn should be located at location Lx (where packet Px was located). For illustration purposes, determine if P8 is to be located at L7 (See FIG. 1C).

If Pn should not be stored at Ln (FIG. 1C), then in step S405, move Px (P3 from location L7 in FIG. 1B) to location Ln (L3 of FIG. 1C).

In step S406 determine a packet (Py) that should be located at location Lx. For illustration purposes, packet P7 at location L2 should be stored at location L7 (FIG. 1C). Hence Py in this case is packet P7.

In step S407, move Py to location Lx. Hence packet P7 is moved from L2 to L7. (FIG. 1C).

If in step S404, if it is determined that Pn should be located at location Lx, then in step S408 move packet Pn−1 to memory buffer 200. For illustration purposes, if packet P8 were to be located at location L7, then move packet P7 from location L2 (FIG. 1B) to memory buffer 200.

In step S409, determine which packet (Px') should be stored at location Ln−1. For illustration purposes, packet P2 should be located at location L2 (FIG. 1C).

In step S410, move Px' to location Ln−1. For illustration purposes, P2 is moved from location L6 to L2 (FIG. 1B).

The foregoing process steps are repeated until all the data packets are reordered as shown in FIG. 1C. Appendix "A" provides an example of a DSS packet reordering system to implement the foregoing aspects of the present invention. Appendix "A" provides a sample of computer executable code for DSS packet reordering, according to one aspect of the present invention. One skilled in the art of computer programming can practice the foregoing aspects of the present invention by using the sample code disclosed in Appendix "A".

By virtue of the foregoing aspects of the present invention, a memory buffer that is smaller the conventional systems is required to reorder numerous data packets. Hence memory cost is reduced and that reduces the overall cost of the system. Furthermore, the present process is more efficient than the conventional prior art systems because data packets are only moved once, unlike conventional systems where data packets are moved more than once.

Although the present invention has been described with reference to specific embodiments, these embodiments are illustrative only and not limiting. Many other applications and embodiments of the present invention will be apparent in light of this disclosure and the following claims.

---

APPENDIX "A"

```
VOID
pgl_gu_packet_recorder (USIGNED8    *buf_p,
                        USIGNED32       filter,
                        USIGNED8    max_packets,
                        pgSD_sat_type_t  cur_network)
{
    register USIGNED8       *next_buf_p;
    register USIGNED8       *hole_buf_p;
    register USIGNED8       *temp_buf_p;
    register USIGNED8       segm_packet;
    register USIGNED16      max_bytes;
    USIGNED8                pckt_cnt;
    USIGNED8                packets;
    USIGNED8                shift_index;
    USIGNED8                *find_buf_p;
    USIGNED8                temp_buf[127];
    USIGNED8                pre_filter;
    /** Find Filter **/
    /** Start with last packet **/
    find_buf_p = (buf_p + ((max_packets - 1) * pgPD_DIRECTV_PACKET_SIZE));
```

-continued

APPENDIX "A"

```
    pre_filter = ((filter >> 24) & 0xff);
    for (segm_packet = O; segm_packet < max_packets; segm_packet++)
    {
        /**Read first byte is faster **/
        if (pgm_ut_readbyte(find_buf_p) == pre_filter)
        {
            if ((unsigned int)pgm_ut_read4bytes (find_buf_p) == filter)
            {
                break;
            }
        }
        /**Point to previous packet **/
        find_buf_p- = pgPD_DIRECTV_PACKET_SIZE;
    }
    if (segm_packet == max_packets)
    {
        /**A failure indicates that no reordering could be done **/
        return;
    }
    /**Readjust because we started from the back of the buffer **/
    segm_packet = (max_packets – segm_packet – 1);
    if (segm_packet == O)
    {
        /** No Reordering is necessary **/
        /** SEGM is first packet already **/
        return;
    }
    /** Precalculate number of bytes in packet buffer **/
    max_bytes = (max_packets * pgPD_DIRECTV_PACKET_SIZE);
    /**MPG is out of sequence **/
    for (packets=O, shift_index=O; packets < max_packets; shift_index++)
    {
        next_buf_p=buf_jp=((segm_packet+shift_index)*
            pgPD_DIRECTV_PACKET_SIZE);
        if (next_buf_p >= (buf_p+ max_bytes))
        {
            next_buf_p = max_bytes;
        }
        /** Store start of copy pointer **/
        temp_buf_p = next_buf_p;
        /** Store packet on stack **/
        memcpy (temp_buf, temp_buf_p, pgPD_DIRECTV_PACKET_SIZE);
        /** Start Packet Moving **/
        for (pckt_cnt=O; pckt_cnt < (max_packets – 1); pckt_cnt++)
        {
            hole_buf_p = next_buf_p;
            /** Store pointer to current holde produced by last copy **/
            /**Point to next packet **/
            next_buf_p+=(segm_packet*pgPD_DIRECTV_PACKET_SIZE);
            if (next_buf_p >+ max_bytes))
            {
                /Went past the end of the buffer/
                next_buf_p -= max_bytes)
            {
            if (next_buf_p == temp_buf_p)
    {
                /**Before all the packets were copied the start packet is
                **the next packet to be copied. Need to shift forward
                **to prevent oscillation
                **/
                break;
            }
            /Copy appropriate packet into hole/
                memcpy(hole_buf_p, next_buf_p, pgPD_DIRECTV_PACKET_SIZE;
                packets++;
            {
            /** Copy temp buffer into next or last packet location **/
                memcpy((buf_p+(shift_index* pgPD_DIRECTV_PACKET_SIZE)),temp_buf,
                    pgPDDIRECTV_PACKET_SIZE);
                packets++;
    }
}
```

What is claimed is:

1. A method for reordering digital spread spectrum (DSS) data packets, comprising:

locating a location (Ln) of a last data packet (Pn);

moving the last data packet Pn to a memory buffer that can at least store a DSS data packet;

locating a data packet (Px) stored at location Lx, that should be located at the location Ln.

2. The method of claim 1, further comprising:

if Pn should be located at Lx, locating a second last packet (Pn−1) to the memory buffer;

locating a packet (Px') at location Lx', that should be located at location Ln−1;

determining if the packet Pn−1 should be located at Lx'; and moving Px' to Ln−1 if Pn−1 is not to be located at location Lx'.

3. The method of claim 1, further comprising:

determining a packet (Py) that should be located at the location Lx; and moving Px' to the location Lx.

4. The method of claim 2, further comprising:

determining a packet (Py') that should he located at Lx'; and moving Py' to Lx'.

5. A computer-readable medium storing computer-executable process steps for reordering a plurality of digital spread spectrum (DSS) data packets, the process steps comprising of:

locating a location (Ln) of a last data packet (Pn);

moving the last data packet Pn to a memory buffer that can at least store a DSS data packet;

locating a data packet (Px) stored at location Lx that should be located at the location Ln;

determining if packet Pn should he located at location Lx; and moving packet Px to location Ln if the packet Pn should not be located at the location Lx.

6. Computer executable process steps of claim 5, further comprising:

if Pn should be located at Lx, moving a second last packet (Pn−1) located at location Ln−1, to the memory buffer;

locating a packet (Px') at location Lx', that should be located at Ln−1;

determining if the packet Pn−1 should be located at Lx'; and moving Px' to Ln−1, if Pn−1 is not to be located at location Lx'.

7. Computer executable process steps of claim 5, further comprising of:

determining a packet (Py) that should be located at the location Lx; and moving Py to the location Lx.

8. Computer executable process steps of claim 6, further comprising:

determining a packet (Py') that should be located at Lx'; and moving Py' to Lx'.

* * * * *

UNITED STATES PATENT AND TRADEMARK OFFICE
CERTIFICATE OF CORRECTION

PATENT NO.   : 6,782,056 B1
DATED        : August 24, 2004
INVENTOR(S)  : Thomas Poslinski et al.

It is certified that error appears in the above-identified patent and that said Letters Patent is hereby corrected as shown below:

Column 1,
Lines 10-12, delete the second paragraph that reads:

"In accordance with 37 CFR § 1.121(b)(1)(iii), Attachment A contains marked up versions of the replacement paragraph illustrating the newly introduced changes in the specification."

Column 2,
Line 18, before "conventional", delete -- the --.
Line 57, after "invention", insert -- , --.

Column 3,
Line 20, after last word "sequences", insert -- . --.

Column 4,
Line 34, after "smaller", delete "the" and insert -- than --.
Line 38, before "conventional", delete -- the --.

Signed and Sealed this

Fourteenth Day of December, 2004

JON W. DUDAS
*Director of the United States Patent and Trademark Office*